(12) United States Patent
Karasek et al.

(10) Patent No.: US 11,704,259 B2
(45) Date of Patent: Jul. 18, 2023

(54) METHOD FOR TRANSFERRING PACKETS OF A COMMUNICATION PROTOCOL

(71) Applicant: Robert Bosch GmbH, Stuttgart (DE)

(72) Inventors: Andreas Karasek, Unterretzbach (AT); Arvid Sievert, Esslingen (DE); Guenter Dankl, Vienna (AT); Marc Zahnlecker, Schwieberdingen (DE); Marco Neumann, Stuttgart (DE); Claus-Michael Schumacher, Steinenbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 78 days.

(21) Appl. No.: 17/451,999

(22) Filed: Oct. 22, 2021

(65) Prior Publication Data
US 2022/0138119 A1 May 5, 2022

(30) Foreign Application Priority Data
Oct. 29, 2020 (DE) ..................... 10 2020 213 584.3

(51) Int. Cl.
*G06F 13/16* (2006.01)
*G06F 12/084* (2016.01)

(52) U.S. Cl.
CPC ........ *G06F 13/1663* (2013.01); *G06F 12/084* (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 11,366,801 B1* | 6/2022 | Kumar | G06F 11/3419 |
| 2017/0206169 A1* | 7/2017 | Coppola | G06F 9/44505 |

FOREIGN PATENT DOCUMENTS

| | | |
|---|---|---|
| DE | 69329607 T2 | 6/2001 |
| EP | 2206294 B1 | 5/2018 |

* cited by examiner

*Primary Examiner* — Michael Sun
(74) *Attorney, Agent, or Firm* — Norton Rose Fulbright US LLP; Gerard Messina (57) ABSTRACT

A method for transferring packets of a communication protocol via a memory-based interface between two processing units. The method includes providing, in each of the processing units, a send area including a read index section, a write index section, and a send buffer, and a receive area including a read index section, a write index section and a receive buffer. Each processing unit repeats as sending steps: reading a read index from the receive area; writing at least one send packet into the send buffer (from a starting write address to an ending write address, the ending write address maximally corresponding to a buffer address assigned to the read read index, and writing a changed write index into the send area.

13 Claims, 2 Drawing Sheets

Fig. 1

METHOD FOR TRANSFERRING PACKETS OF A COMMUNICATION PROTOCOL

FIELD

The present invention relates to a method for transferring packets of a communication protocol via a memory-based interface and to a processing unit, to a system and to a computer program for carrying out the method.

BACKGROUND INFORMATION

In control units (of motor vehicles or machines in industrial plants) which use multiple processing units, such as microcontrollers, it is possible to use a serial communication (e.g., UART including a proprietary protocol) or an Ethernet-based approach including an additional Ethernet switch in hardware for the communication between the processing units. The disadvantage of proprietary protocols is that, depending on the system used, an adaptation to the native communication mechanisms must take place, which necessitates additional software layers. In the Ethernet switch-based systems, the costs and the complexity increase due to the additional hardware components and the increased space requirement on a potential circuit board.

SUMMARY

According to the present invention, a method for transferring packets of a communication protocol via a memory-based interface, and a processing unit, a system and a computer program for carrying out the method are provided. Advantageous embodiments of the present invention are disclosed herein.

An example embodiment of the present invention utilizes the measure of writing packets which are to be sent to respective send buffers, transferring the content of the send buffers via the memory-based interface into corresponding receive buffers, and reading out the packets from the respective receive buffers, write and read indices also being transferred at the same time, which allow the respective other processing unit to detect the available memory space or the memory area which was not yet read out. The transfer via the memory-based interface may take place asynchronously with the writing and reading in the processing units. The send and receive buffers are configured as circular buffers, so that the send and receive areas which are to be transferred via the memory-based interface are always the same after initialization.

Explicit knowledge of the communication protocol whose packets are being transferred is not necessary for the implementation of the method. A software layer, in which the encoding of the packets is converted into a protocol of the memory-based interface, may thus be dispensed with. Additional hardware, for example an Ethernet interface and Ethernet switches or the like, which implements a packet-oriented communication corresponding to the communication protocol, may also be dispensed with. Rather, the data transfer may take place by a memory-based interface, which is potentially already present, regardless of the communication protocol used, a tunneling process, so to speak, being implemented. In particular, packets of different communication protocols may be transferred.

The interface may have a cost-effective design, e.g., as a serial interface. For example, a low-voltage differential signaling (LVDS) interface may be used as the interface. Here, for example, 5-pole LFAST/SIPI interfaces (LVDS fast asynchronous serial transmission interface; serial interprocessor interface) may be used, two lines per communication direction being used, and a fifth line for a synchronization signal. Such interfaces offer transfer bandwidths of several hundred Mbit/s (e.g., 320 Mbit/s).

The processing units are the users of the method. The read and write indices indicate buffer addresses in the send and receive buffers and are used in the method to share with the other processing unit the positions in the send and receive buffer up to which a processing unit has written or read packets. During the implementation, these positions may define the respective position which was read or written last, or positions to be read or written to next. The specific implementation only has to be taken into consideration during the method sequence.

Based on these indices, the two processing units (or users) may, in principle, write to the respective send buffer and read the respective receive buffer independently of one another, in particular, without direct synchronization. An overwriting of packets not yet read or a reading of invalid areas of the receive buffers is avoided (so that a synchronization takes place indirectly). The sending steps in a processing unit may be carried out independently of the reading steps in this or the other processing unit. The sequences of the reading steps or of the sending steps are carried out in repetitions in the processing units until the method is ended. The transfer of the send areas of the processing units into the receive area of the respective other processing unit also takes place via the interface, independently of the sending and reading steps. Since the entire send areas are transferred in each case, knowledge about the packets to be sent, or about the send buffer areas occupied thereby, is not necessary.

More precisely, the read index sections of the send areas are each configured to store a read index to which a buffer address may be assigned in the receive buffer of the receive area of the same processing unit, the write index sections of the send areas are each configured to store a write index to which a buffer address may be assigned in the send buffer of the respective send area, the read index sections of the receive areas are each configured to store a read index to which a buffer address may be assigned in the send buffer of the send area of the same processing unit, and the write index sections of the receive areas are each configured to store a write index to which a buffer address may be assigned in the receive buffer of the respective receive area.

A circular buffer refers to a memory area which may be addressed by (logic) buffer addresses, which may be regarded as elements of the residue class ring □N. In the process, N is the number of memory addresses of the circular buffer, i.e., its length. One elementary memory unit may be stored at each memory address, thus N elementary memory units being storable in the circular buffer. Depending on implementation, the elementary memory unit may, e.g., be a bit, a byte, a 16-bit word, a 32-bit word, a 64-bit word, or the like. The memory addresses of the circular buffer may be addressed as (logic) buffer addresses, which range from 0 to N−1. The address computation using buffer addresses may then be easily implemented with the aid of modular arithmetic, i.e., when buffer addresses are added or subtracted, an integer multiple of N is added to the result to obtain a buffer address in the range of 0 to N−1, i.e., k·N is added to the result, k being a (positive or negative) integer. k is selected in such a way that a number (buffer address) in the range of 0 to N−1 is obtained. When the circular buffer extends between a lowest and a highest physical memory address (and when a logic buffer address corresponds to each physical memory address), the process continues again with the lowest memory address when the highest memory address has been reached. The actual physical arrangement of the memory area configured as a circular buffer in the memory, however, does not have to correspond to the arrangement of the (logic) buffer addresses. For example, it is possible that the memory area is not coherently situated as multiple memory sub-areas in the memory. Corresponding to the present invention, the memory area is accessed first according to the FIFO principle (first in-first out, i.e., data stored first are read out again first). Write addresses and read addresses are buffer addresses.

The expression "memory-based interface" is to denote an interface which transfers a (coherent or non-coherent) memory area of a sender into a corresponding memory area of a receiver. In the process, the data in the sender memory area are copied into the receiver memory area, i.e., transferred 1:1.

The packets may be data packets of an arbitrary packet-oriented or serial communication protocol. Knowledge of the configuration of the packets, i.e., knowledge of the communication protocol, is not necessary for the implementation of the method. Data to be sent may only optionally also be encoded and decoded according to the communication protocol.

The packets are preferably packets of a standard protocol, in particular of a TCP/IP protocol or Internet protocol, of an Ethernet protocol, a controller area network (CAN) protocol, a local interconnection network (LIN) protocol. The present invention enables the linking of standard protocols to a memory-based interface so that the use of hardware or a physical implementation (e.g., PHY, cables, switches, etc.), which are usually associated with the use of standard protocols, may be dispensed with. In addition, the used protocol may thus be maintained unchanged on the side of the application software running in the processing units. The use of these standard protocols remains advantageous since an error correction is implemented therein, i.e., packets which erroneously arrived or did not arrive at the receiver are identified by an appropriate protocol mechanism and are sent again. Such a mechanism may then be dispensed with within the scope of the method of the present invention.

Another advantage of the present invention is due to the fact that packets of multiple communication protocols which differ from one another may be transferred simultaneously. The method according to the present invention thus preferably relates to the transfer of packets of multiple communication protocols.

Preferably, each processing unit, as a sender, furthermore encodes data to be sent in at least one packet to be sent according to the communication protocol, at least one send packet being formed of the at least one packet to be sent. Each processing unit, as a receiver, also preferably forms at least one received packet of the at least one reception packet and decodes the at least one received packet according to the communication protocol to obtain the sent data. If the data to be sent are not yet encoded in packets, this may advantageously take place during the transfer process.

During the writing steps, the write index is preferably determined in each case as a buffer address, in particular as the ending write address, and/or, during the reading steps, the read index is determined in each case as a buffer address, in particular as the ending read address. This enables a simple calculation of write addresses from the write indices, and vice versa, or of read addresses from the read indices, and vice versa.

The step of providing preferably encompasses an initialization, a first and a second initialization index, to which buffer addresses are assigned, being predefined; in one of the processing units, the first initialization index being written to the write index section of the send area and to the read index section of the receive area, the second initialization index being written into the read index section of the send area and into the write index section of the receive area, and an initial starting write address being determined as a buffer address situated behind the buffer address assigned to the first initialization index; and in the other of the processing units, the second initialization index being written into the write index section of the send area and into the read index section of the receive area, the first initialization index being written into the read index section of the send area and into the write index section of the receive area, and an initial starting write address being determined as a buffer address situated behind the buffer address assigned to the second initialization index. In this way, a defined starting state is obtained. Furthermore, the interface may also be initialized, the memory locations (in the memories of the processing units) of the send buffer and receive buffer, between which the transfer is to take place, being shared with this interface.

Preferably, each processing unit, on the sender side, as sending steps, furthermore compares, after the read index has been read and before the at least one packet to be sent has been written, a packet length of the at least one packet to be sent to an available send buffer space in the send buffer, the available send buffer space being determined based on the read read index; and, when the packet length is not greater than the available send buffer space, continues to write the at least one packet to be sent into the send buffer; or, when the packet length is greater than the available send buffer space, suppresses the writing of the at least one packet to be sent and, preferably, discards the at least one packet to be sent. As an alternative or in addition to the discarding, it is possible to repeat the comparison after a waiting period, the read index being read out from the read index section of the receive buffer again before the comparison is repeated. In this way, the condition that no buffer areas which have not yet been read are overwritten may be easily met.

Preferably, each processing unit, on the sender side, determines packet information during each repetition for at least one packet to be sent, and adds the determined packet information to the at least one packet to be sent, preferably at the beginning of the at least one packet to be sent, to form the at least one send packet. Further preferably, the packet information encompasses a packet length and/or a packet starting designation and/or a packet ending designation and/or a packet identification, e.g., a packet number. Such packet information may be evaluated by the receiver to efficiently read the packets.

Preferably, each processing unit, on the receiver side, evaluates the packet information of the at least one reception packet during each repetition and, based thereon, forms at least one received packet. Further preferably, a processing unit, when the respective processing unit, on the receiver side, establishes during the evaluation of the packet information that the at least one reception packet is incomplete, sends a request to the other, sender-side processing unit to send the corresponding at least one send packet again. This enables a rapid error correction, regardless of a correction which is implemented in the communication protocol, according to which the packets are encoded. This specific embodiment is particularly advantageous in combination with communication protocols which do not implement any dedicated error correction, in particular proprietary protocols.

A processing unit according to an example embodiment of the present invention, e.g., a microcontroller in a control unit, e.g., of a motor vehicle, is configured to carry out all sender-side and receiver-side method steps of a method according to the present invention.

A system according to an example embodiment of the present invention includes two processing units according to the present invention, which are connected to one another via a memory-based interface, the memory-based interface being configured to carry out all interface-side method steps of a method according to the present invention.

In addition, the implementation of a method according to the present invention in the form of a computer program or a computer program product having program code for carrying out all method steps is advantageous since this incurs particularly low costs, in particular when an executing control unit is also used for additional tasks and is therefore present anyhow. Suitable data media for providing the computer program are, in particular, magnetic, optical and electrical memories, such as hard disks, flash memories, EEPROMs, DVDs, and the like. It is also possible to download a program via computer networks (Internet, Intranet, and the like).

Further advantages and embodiments of the present invention are derived from the description and the figures.

The present invention is schematically shown based on exemplary embodiments in the figures and is described hereafter with reference to the figures.

DETAILED DESCRIPTION OF EXAMPLE EMBODIMENTS

Figure 1:
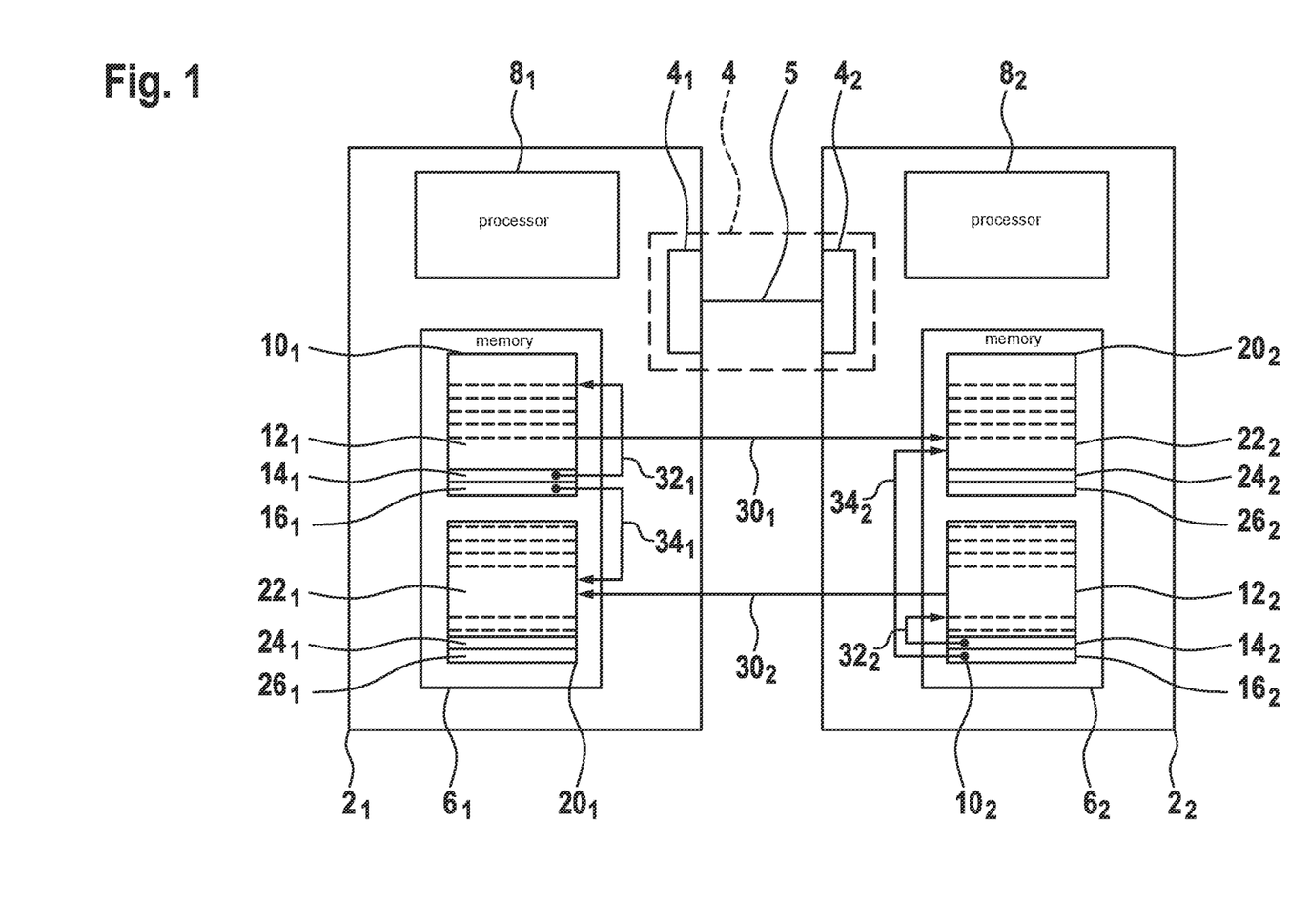
FIG. 1 shows the schematic structure of a method according to an example embodiment of the present invention and of the involved units.

FIG. 1 illustrates the schematic structure of a method according to the present invention for carrying out a communication according to a packet-oriented communication protocol via a memory-based interface, packets being transferred between two processing units via the interface.

Users of the method are a first processing unit $2_1$ and a second processing unit $2_2$, which are connected to one another via memory-based interface 4. Memory-based interface 4 is implemented in the form of interface modules $4_1$, $4_2$ in processing units $2_1$, $2_2$, which are connected to one another for data exchange, e.g., with the aid of connecting lines 5, a wireless connection also being possible.

Processing units $2_1$, $2_2$ furthermore each include a memory $6_1$, $6_2$, which, in particular, is the working memory of processors $8_1$, $8_2$ (each including one or multiple processor cores) of the processing units. In addition to the shown elements, the processing units may, of course, include further elements, in particular, further interfaces and further memories (such as flash memories). The elements (memories, processors, interface modules and further elements) are connected to one another for the data exchange via connections or connecting lines, which are not shown in greater detail (such as serial or parallel connections). The elements of the processing units may in each case be partially or completely integrated into a chip.

In each memory $6_1$, $6_2$, a respective send area $10_1$, $10_2$ and receive area $20_1$, $20_2$ are provided. Each send area $10_1$, $10_2$ includes a send buffer $12_1$, $12_2$, which is configured as a circular buffer, a write index section $14_1$, $14_2$, and a read index section $16_1$, $16_2$. Each receive area $20_1$, $20_2$ includes a receive buffer $22_1$, $22_2$, which is configured as a circular buffer, a write index section $24_1$, $24_2$, and a read index section $26_1$, $26_2$.

Receive area $20_1$, in particular its receive buffer $22_1$, in memory $6_1$ of first processing unit $2_1$ has the same size as send area $10_2$, in particular its send buffer $12_2$, in memory $6_2$ of second processing unit $2_2$. Receive area $20_2$, in particular its receive buffer $22_2$, in memory $6_2$ of second processing unit $2_2$ also has the same size as send area $10_1$, in particular its send buffer $12_1$, in memory $6_1$ of first processing unit $2_1$.

Corresponding to this configuration, the send area of a processing unit may thus be mapped to the receive area of the respective other processing unit. This takes place by memory-based interface 4, which transfers or copies (arrow $30_1$) send area $10_1$ of first processing unit $2_1$ into receive area $20_2$ of second processing unit $2_2$ at certain first points in time, and transfers or copies (arrow $30_2$) send area $10_2$ of second processing unit $2_2$ into receive area $20_1$ of first processing unit $2_1$ at certain second points in time. These transfers may take place, e.g., at regular intervals, i.e., the first and the second points in time are regularly spaced apart in each case, independently of one another.

Each of the processing units is configured to write (one or multiple) packets to be sent into its send buffer, the end of the area in which the packets were in each case written into the send buffer being written in the form of a write index into the write index section of the send buffer. The area into which the packets are written extends from a starting send buffer address to an ending send buffer address in the send buffer. The end of the area (ending send buffer address) may be unambiguously assigned to the write index, i.e., the ending send buffer address may be determined from the write index. If, e.g., at a later point in time, (other) packets are to be sent again, these new packets, starting at the buffer address following the last ending send buffer address, are written into the send buffer, a new ending send buffer address and, accordingly, a new write index, which is again written into the write index section, then being determined based on the new writing.

Furthermore, each of the processing units is configured to read received data, i.e., (one or multiple) received packets, from its receive area, the end of the area up to which the packets were in each case read from the receive buffer, being written in the form of a read index into the read index section of the send buffer (of the processing unit which reads the packets). The area from which the packets were read extends from a starting receive buffer address to an ending receive buffer address in the receive buffer. The end of the area (ending receive buffer address) may be unambiguously assigned to the read index, i.e., the ending receive buffer address may be determined from the read index. If, e.g., at a later point in time, (other) packets are received again, these new packets, starting at the buffer address following the last ending receive buffer address, are read from the receive buffer, a new ending receive buffer address and, accordingly, a new read index, which is again written into the read index section, then being determined based on the new reading.

During or prior to the writing of packets to be sent, the read index (which indicates up to which buffer address the packets were read out by the other processing unit) is read from the read index section of the receive buffer, and the packets are written maximally up to the buffer address assigned to the read index, so that it is ensured that packets which have not yet been read are not overwritten. During or prior to the reading of received packets, the write index (which indicates up to which buffer address packets were written by the other processing unit) is read from the write index section of the receive area, and the receive buffer is read maximally up to the buffer address assigned to the write index, so that it is ensured that only valid packet data are read.

In FIG. 1, the areas in send and receive buffers to which packets have been written which have not been read yet are indicated by a dotted line, a state immediately after the transfer being shown, i.e., the areas in the receive buffers correspond 1:1 to the areas in the send buffers. In the process, arrows $32_1$, $32_2$, $34_1$, $34_2$ denote to which addresses the write and read indices refer which were written by the processing units into the write index sections and read index sections. More precisely, the write indices in write index sections $14_1$, $14_2$ refer to the address up to which the respective processing unit has written packets into send buffer $12_1$, $12_2$ (arrows $32_1$, $32_2$). The read indices in read index sections $16_1$, $16_2$ refer to the address up to which the respective processing unit has read packets from receive buffer $22_1$, $22_2$ (arrows $34_1$, $34_2$).

The sending steps and the receiving steps in each of the processing units may take place independently of one another. During sending, the writing may take place, for example, as soon as new packets are to be sent (provided that no packets which have not yet been read are overwritten). On the receiver side, it may be regularly checked, for example, whether the write index in the write index section of the receive area has changed and, if this is the case, a reading may be prompted.

The data to be sent or packets to be sent are, for example, generated in processes or computer programs which are executed in processors $8_1$, $8_2$ of the processing units.

Figure 2A:
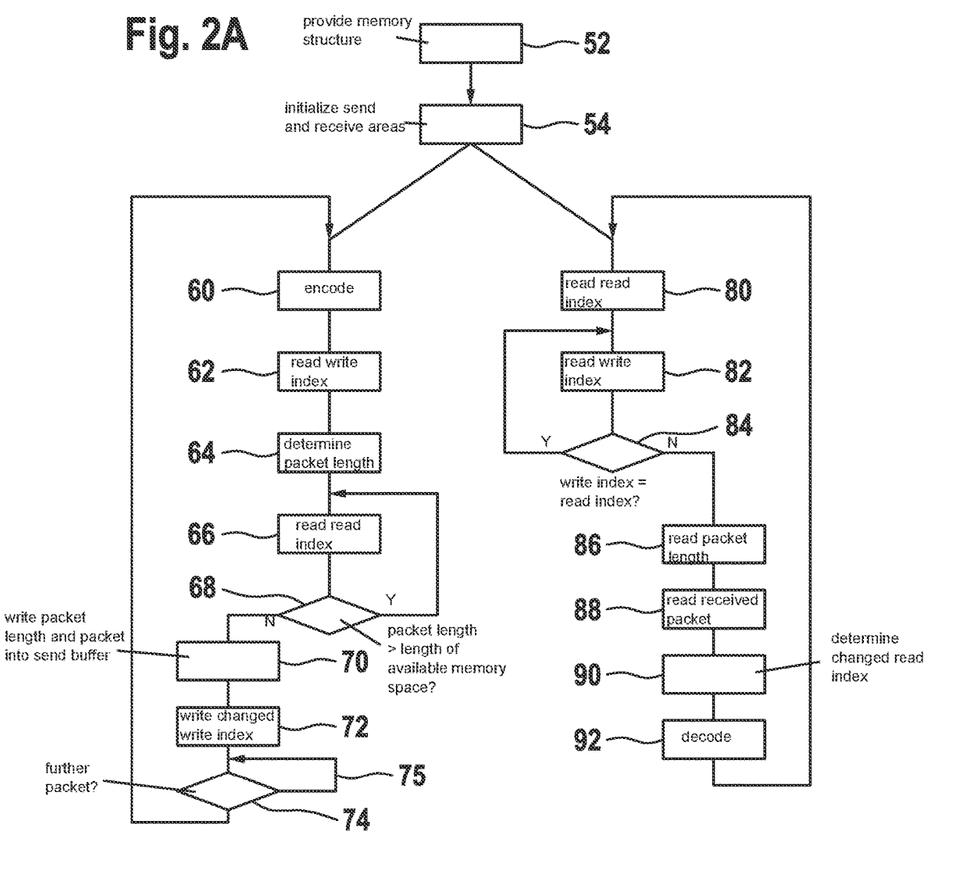
FIG. 2A shows a flowchart of a method sequence on the side of the processing units according to a preferred specific example embodiment of the present invention.
Figure 2B:
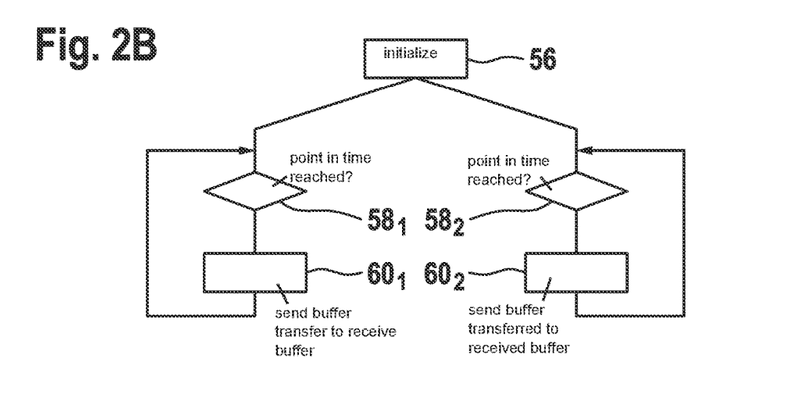
FIG. 2B shows a flowchart of a method sequence on the side of the memory-based interface according to a preferred specific example embodiment of the present invention.

FIGS. 2A and 2B show flowcharts of a method sequence according to a preferred specific embodiment of the present invention. FIG. 2A shows the method sequence in the processing units, and FIG. 2B shows the method steps in the interface. The method sequence of the processing units branches into a sender-side and a receiver-side strand, in which the method steps are shown which each of the processing units carries out as a sender or as a receiver.

In this specific embodiment, it is assumed that the write and read indices are buffer addresses. In the process, the write indices are in each case the last send buffer address of the area into which a packet was written by a processing unit as a sender to its send buffer, i.e., the last write address or the ending write address. The read indices are also in each case the last receive buffer address of the area from which a packet was read by a processing unit as a receiver from its receive buffer, i.e., the last read address or the ending read address. The assignment of buffer addresses to the write and read indices is thus trivial since the write and read indices themselves are the respective buffer addresses.

More generally speaking, other assignments are also possible, e.g., write and read indices could be buffer addresses which differ in each case by a certain number of buffer addresses from the ending write addresses and the ending read addresses, i.e., are shifted in each case by the certain number (the above case corresponds to a number of zero). As mentioned, read indices and/or write indices may also define the positions to be read or to be written to next.

Write and read indices could also be addresses which are continuous, i.e., do not take the modular arithmetic of the buffer addresses into consideration. The assignment then takes place by modulo formation, i.e., the buffer addresses are obtained as a residue during the division of the write or read indices by the respective buffer length. In this way, the entire sent data volume of each processing unit may be read off the write and read indices and, e.g., if it is established that one processing unit is sending more data (larger overall sent data volume) than the other, the transfer bandwidth in each direction may optionally be accordingly adapted by the interface, i.e., the distance between the points in time at which the data are transferred from the processing unit which is sending more data to the other is decreased, and the distance between the points in time of the transfer in the other direction is increased.

Another possible assignment is to divide the circular buffers (send buffer, receive buffer) into sections of equal length which are consecutively numbered, the write and read indices then being numbered in accordance with this consecutive numbering. This may be employed, e.g., when all packets have the same length or when at least one maximum packet length is known.

In FIG. 2A, in step 52, the memory structure, as described in connection with FIG. 1, is initially provided in the processing units, i.e., the send and receive areas are provided in the processing units or corresponding memory areas are reserved.

In step 54, an initialization (which may also be regarded as part of the provision step) of the send and receive areas, in particular, also of the read and write index sections encompassed therein, takes place. In the process, a first buffer address (which is a buffer address in the send buffer of the first processing unit) is written into the write index sections of the send buffer of the first processing unit and the receive buffer of the second processing unit, and into the read index sections of the receive buffer of the first processing unit and the send buffer of the second processing unit, and a second buffer address (which is a buffer address in the send buffer of the second processing unit) is written into the write index sections of the send buffer of the second processing unit and the receive buffer of the first processing unit, and into the read index sections of the receive buffer of the second processing unit and the send buffer of the first processing unit. In the simplest case, the write and read indices may all be set to the same buffer address, i.e., buffer address 0, when the buffer addresses run from 0 to $N_1-1$ (send buffer of first processing unit, receive buffer of second processing unit) or from 0 to $N_2=1$ (send buffer of second processing unit, receive buffer of first processing unit), i.e., written into the write and read index sections.

According to the preferred specific embodiment of FIG. 2A, each of the processing units for each packet to be sent carries out the following, partially optional sending steps (left strand of FIG. 2A):

Data to be sent may initially be encoded into a packet to be sent in optional step 62 according to a communication protocol. Such an encoding may also have been previously carried out, e.g., by the computer program executed in the processor which sends the data. For this purpose, a communication stack of the communication protocol, which, in principle, may be regarded as a computer program, may be executed or implemented in the processor. Examples are a TCP/IP stack or, in a motor vehicle environment when the processing units are, for example, microcontrollers of a control unit, an AUTomotive Open System ARchitecture (AUTOSAR) stack. Packets, which are then sent in accordance with the method according to the present invention, may be created by the communication stack from data to be sent. The packets created by the communication stack correspond to the specification or the standard of the corresponding communication protocol, e.g., Ethernet packets or IP packets (including MAC, IP, UDP/TCP-IP etc.) may thus be created.

Furthermore, the length of the packet to be sent is determined in step 62, the write index is read from the write index section of the send buffer in step 64, and the read index is read from the read index section of the receive buffer (of the sending processing unit) in step 66. Steps 62, 64 and 66 may also be carried out in a different order than the one shown. The write index, or the send buffer address which is assigned thereto (and here is the write index itself), may also or additionally be stored by the sender in another memory location, for example in a processor register; in this case, step 64 may be dispensed with, it then being possible to withdraw the write index or the send buffer address assigned thereto from this other memory location.

In step 68, an available memory space in the send buffer or its length is determined and compared to the determined packet length. The length of the available memory space is calculated from the read read index and the write index. If, as is the case here (see above), it is assumed that the write and read indices themselves are buffer addresses, the write index may be subtracted from the read index for this purpose, a negative result (due to buffer transition) having to be subtracted from the buffer size.

When the packet length is greater than the length of the available memory space, it is possible, after a potential waiting period, to jump back to step 66, the reading of the read index, i.e., the writing is initially suppressed. Step 62 (reading write index) and step 64 (determining packet length) do not have to be carried out again. This, however, requires additional memory space for buffering the packets.

In step 68, in particular in combination with standard protocols which implement an error correction, the corresponding packet is thus preferably discarded, and the process is continued with step 70 (i.e., the process does not jump back to step 66). Additional memory space for buffering may then be dispensed with. These two options may also be combined, e.g., a discarding may only take place when the additional memory space is not sufficient.

When, on the other hand, the packet length is not greater than the length of the available memory space, in step 70 initially the packet length and thereafter the packet to be sent are written into the send buffer. This writing takes place starting at the send buffer address which follows the write index (which is a send buffer address here), which is also referred to as the starting write address. The last send buffer address up to which the packet to be sent is written, which is also referred to as the ending write address, is subsequently written in step 72 as a changed write index into the write index section of the send buffer. For more general write indices which are not write addresses themselves, the appropriate assignment must be taken into consideration in the process. If the write index is also stored in another memory location (for example a processor register), it is, of course, also accordingly updated there.

The packet length and the packet to be sent together form a send packet. In general, when no packet length is added, the packet to be sent alone may also represent a send packet or when, in addition or as an alternative to the packet length, further packet information is added to the packet to be sent, this packet information (including, if necessary, the packet length) together with the packet to be sent forms a send packet.

In step 74, it is then checked whether a further packet to be sent is present. If this is the case, the process continues again for the further packet to be sent with step 60 (encoding) or step (reading write index) or, depending on the order of steps 62, 64, 66, with step 64 (determining packet length) or step 66 (reading read index). If this is not the case (arrow 75), step 74 is carried out again, if necessary after a certain waiting period.

According to the preferred specific embodiment of FIG. 2A, each of the processing units carries out the following, partially optional receiving steps (right strand of FIG. 2A):

Initially, in step 80, the read index is optionally read by the respective processing unit from the read index section of the send buffer. As an alternative, the processing unit may also store the read index or the buffer address assigned thereto (receive buffer address) in another memory location and read it out therefrom, or also store/read it in a processor register.

In step 82, which may also take place prior to step 80, the write index is read from the write index section of the receive buffer.

The read write index is compared to the read index in step 84 to establish whether packets which have not yet been read were received. If no unread packets are present, i.e., if the buffer address assigned to the write index is identical to the buffer address assigned to the read index (i.e., in the present case, in which the write and read indices themselves are the buffer addresses, when the write index is identical to the read index), the process jumps back to step 82 (reading the write index), possibly after a certain waiting period, and the method is carried out again proceeding from there. Carrying out step 80 (reading read index) again may be dispensed with (with reverse order of steps 80 and 82).

If, on the other hand, unread packets are present, i.e., if the buffer address assigned to the write index is not identical to the buffer address assigned to the read index (i.e., in the present case, in which the write and read indices themselves are the buffer addresses, when the write index is not identical to the read index), the packet length is read from the receive buffer of the receive area in step 86, and in particular proceeding from the buffer address following the buffer address assigned to the read index (starting read address). Corresponding to the packet length, the received packet is then read from the receive buffer of the receive area in step 88, i.e., buffer addresses following the packet length are read in accordance with the packet length. Together, the packet length and the received packet form a reception packet. If, in addition or as an alternative to the packet length, other packet information is written during sending, this information is read and, based thereon, the received packet is read. For example, the received packet could be read from a packet starting designation to a packet ending designation (which may in each case be a certain bit pattern).

In step 90, a changed read index is determined based on the last read buffer address, i.e., the buffer address (ending read address) which corresponds to the end of the packet read last, and written into the read index section of the send buffer. Since the read index here (see above) itself is a buffer address (the assignment is thus trivial), the ending read address is written into the read index section. If the read index is also stored in another memory location (for example a processor register), it is, of course, also accordingly updated there.

The received and read packet may be decoded in optional step 92 in accordance with the communication protocol, e.g., by an appropriate communication stack. The received and possibly decoded packet may then be further processed by a computer program in the receiving processing unit.

Finally, the process jumps back to the beginning of the reading steps, i.e., to step 80 or, depending on the order, to step 82.

FIG. 2B shows the method sequence on the side of the memory-based interface. After the send and receive buffers have been provided, or as soon as their size and location in the memory of the processing units are known, an initialization (step 56) of the memory-based interface may be carried out, it being communicated to the memory-based interface, on the one hand, which memory areas (send/receive buffers) of the processing units are to be transferred to one another (e.g., by indicating the respective starting and ending addresses of the memory areas based on the memories of the processing units) and, on the other hand, it being established at what points in time the transfer of the sending areas to the receive areas is to take place. In principle, it is also possible in the process to establish the transfer points in time to be later, or to re-establish them regularly, for example to adapt the transfer bandwidth or frequency in each direction.

During the further course, the interface for each transfer direction or for each processing unit undergoes a loop, during which it is initially checked (step $58_1$, $58_2$) whether (or it is waited until) a point in time at which the transfer of the send buffer of the respective processing unit is to take place, has been reached; thereafter, if this is the case, the respective send buffer is transferred to the receive buffer of the other processing unit (step $60_1$, $60_2$), and thereafter the process returns to checking steps $58_1$, $58_2$ again to wait for the next point in time. The points in time for the first processing unit may be independent of the points in time of the second processing unit. The points in time may also be the points in time at which the respective preceding transfer process is completed, or may be determined by these points in time. For example, upon completion of a transfer process, the respective (possibly changed) send buffer may be transferred, after a certain time period, to the receive buffer of the other processing unit again, it also being possible for the time period to be zero. These steps are carried out continuously by the interface, in parallel to (and independently of) the above-described sending and receiving steps, until the method per se has ended.

What is claimed is:

1. A method for transferring packets of a communication protocol via a memory-based interface between two processing units, comprising the following steps:
providing, in each of the processing units, a send area and a receive area in a respective memory, each of the send areas including a read index section, a write index section, and a send buffer configured as a circular buffer, each of the receive areas including a read index section, a write index section, and a receive buffer configured as a circular buffer, the receive buffer of each of the processing units having the same size as the send buffer of the other of the processing units, the read index sections and the write index sections being configured to store read indices and write indices, to which buffer addresses may be assigned;
each processing unit of the processing units, on a sender side, repeatedly carrying out as sending steps:
reading a read index from the read index section of the receive area of the processing unit;
writing at least one send packet into the send buffer of the processing unit from a starting write address to an ending write address, the ending write address maximally corresponding to the buffer address assigned to the read read index, and the starting write address being situated behind the ending write address of a preceding repetition of the sending steps; and
determining a write index in such a way that the ending write address is assigned to the write index, and writing the determined write index to the write index section of the send area of the processing unit,
each processing unit of the processing units, on a receiver side, repeatedly carrying out as receiving steps:
reading a write index from the write index section of the receive area of the processing unit;
reading at least one reception packet from the receive buffer of the processing unit from a starting read address to an ending read address, the ending read address, proceeding from the starting read address, maximally corresponding to the buffer address assigned to the read write index, and the starting read address being situated behind the ending read address of a preceding repetition of the receiving steps; and
determining a read index in such a way that the ending read address is assigned to the read index, and writing the determined read index into the read index section of the send area of the processing unit,
the memory-based interface carrying out:
transferring the send areas of each of the processing units to the receive area of the other of the processing units at points in time which are independent of the repetitions of the sending steps and receiving steps.

2. The method as recited in claim 1, wherein:
each of the processing units as a sender carries out:
encoding data to be sent in at least one packet to be sent according to a communication protocol, the at least one send packet being formed of the at least one packet to be sent; and/or
each of the processing units as a receiver carries out:
forming at least one received packet from the at least one reception packet and decoding the at least one received packet according to the communication protocol to obtain the sent data.

3. The method as recited in claim 1, wherein, during the writing steps, the write index is determined in each case as a buffer address, the buffer address being the ending write address, and/or, during the reading steps, the read index is determined in each case as a buffer address, the buffer address being the ending read address.

4. The method as recited in claim 1, wherein the providing step includes an initialization, a first and a second initialization index, to which buffer addresses are assigned, being predefined, in one processing unit of the processing units, the first initialization index being written into the write index section of the send area of the one processing unit and into the read index section of the receive area of the one processing unit, the second initialization index being written into the read index section of the send area of the one processing unit and into the write index section of the receive area of the one processing unit, and an initial starting write address being determined as a buffer address situated behind the buffer address assigned to the first initialization index; and in the other processing unit of the processing units, the second initialization index being written into the write index section of the send area of the other processing unit and into the read index section of the receive area of the other processing unit, the first initialization index being written into the read index section of the send area of the other processing unit and into the write index section of the receive area of the other processing unit, and an initial starting write address being determined as a buffer address situated behind the buffer address assigned to the second initialization index.

5. The method as recited in claim 1, wherein each processing unit of the processing units, on the sender side, furthermore carries out, as sending steps:
comparing, after the read index has been read and before the at least one packet to be sent has been written, a packet length of the at least one packet to be sent to an available send buffer space in the send buffer of the processing unit, the available send buffer space being determined based on the read read index; and,
when the packet length is not greater than the available send buffer space, continuing to write the at least one packet to be sent into the send buffer of the processing unit, or when the packet length is greater than the available send buffer space, suppressing the writing of the at least one packet to be sent and, discarding the at least one packet to be sent or repeating the comparison after a waiting period, the read index being read out again from the read index section of the receive buffer of the processing prior to the comparison being repeated.

6. The method as recited in claim 1, wherein each of the processing units, on the sender side, determines packet information during each repetition for at least one packet to be sent, and adds the determined packet information to the at least one packet to be sent, at a beginning of the at least one packet to be sent, to form the at least one send packet.

7. The method as recited in claim 6, wherein the packet information includes a packet length and/or a packet starting designation and/or a packet ending designation and/or a packet identification and/or a packet number.

8. The method as recited in claim 6, wherein each of the processing units, on the receiver side, evaluates the packet information of the at least one reception packet during each repetition and, based on the packet information, forms at least one received packet.

9. The method as recited in claim 8, wherein each processing unit of the processing units, when the processing unit, on the receiver side, establishes during the evaluation of the packet information that the at least one reception packet is incomplete, sends a request to the other, sender-side processing unit to send a corresponding at least one send packet again.

10. The method as recited in claim 2, wherein the communication protocol is one or multiple of the following: a TCP/IP, an Ethernet protocol, a controller area network protocol, a local interconnection network protocol.

11. A processing unit configured to transfer packets of a communication protocol via a memory-based interface with another processing unit, the processing unit configured to:
provide, in the processing unit, a send area and a receive area in a memory, the send area including a read index section, a write index section, and a send buffer configured as a circular buffer, the receive area including a read index section, a write index section, and a receive buffer configured as a circular buffer, the receive buffer of the processing unit having the same size as a send buffer of the other processing unit, the read index section and the write index section being configured to store a read index and a write index, to which buffer addresses may be assigned;
wherein, on a sender side, the processing unit is configured to repeatedly carry out as sending steps:
reading the read index from the read index section of the receive area of the processing unit;
writing at least one send packet into the send buffer of the processing unit from a starting write address to an ending write address, the ending write address maximally corresponding to the buffer address assigned to the read read index, and the starting write address being situated behind the ending write address of a preceding repetition of the sending steps; and
determining the write index in such a way that the ending write address is assigned to the write index, and writing the determined write index to the write index section of the send area of the processing unit,
wherein on a receiver side, the processing unit is configured to repeatedly carry out as receiving steps:
reading the write index from the write index section of the receive area of the processing unit;
reading at least one reception packet from the receive buffer of the processing unit from a starting read address to an ending read address, the ending read address, proceeding from the starting read address, maximally corresponding to the buffer address assigned to the read write index, and the starting read address being situated behind the ending read address of a preceding repetition of the receiving steps; and
determining the read index in such a way that the ending read address is assigned to the read index, and writing the determined read index into the read index section of the send area of the processing init.

12. A system, comprising:
two processing units; and
a memory-based interface,
wherein the system is configured to transferring packet of a communication protocol via the memory-based interface between the two processing units:
wherein each processing unit of the processing units is configured to provide, in the processing unit, a send area and a receive area in a respective memory, each of the send areas including a read index section, a write index section, and a send buffer configured as a circular buffer, each of the receive areas including a read index section, a write index section, and a receive buffer configured as a circular buffer, the receive buffer of each of the processing units having the same size as the send buffer of the other of the processing units, the read index sections and the write index sections being configured to store read indices and write indices, to which buffer addresses may be assigned;
wherein each processing unit of the processing units, on a sender side, is configured to repeatedly carrying out as sending steps:
reading a read index from the read index section of the receive area of the processing unit;
writing at least one send packet into the send buffer of the processing unit from a starting write address to an ending write address, the ending write address maximally corresponding to the buffer address assigned to the read read index, and the starting write address being situated behind the ending write address of a preceding repetition of the sending steps; and determining a write index in such a way that the ending write address is assigned to the write index, and writing the determined write index to the write index section of the send area of the processing unit, wherein each processing unit of the processing units, on a receiver side, is configured to repeatedly carrying out as receiving steps:

reading a write index from the write index section of the receive area of the processing unit;

reading at least one reception packet from the receive buffer of the processing unit from a starting read address to an ending read address, the ending read address, proceeding from the starting read address, maximally corresponding to the buffer address assigned to the read write index, and the starting read address being situated behind the ending read address of a preceding repetition of the receiving steps; and determining a read index in such a way that the ending read address is assigned to the read index, and writing the determined read index into the read index section of the send area of the processing unit, and wherein the memory-based interface is configured to transfer the send areas of each of the processing units to the receive area of the other of the processing units at points in time which are independent of the repetitions of the sending steps and receiving steps.

13. A non-transitory machine-readable memory medium on which is stored a computer program for a processing unit for transferring packets of a communication protocol via a memory-based interface with another processing unit, the computer program, when executed by the processing unit, causing the processing unit to perform the following steps:

providing, in the processing unit, a send area and a receive area in a memory, the send area including a read index section, a write index section, and a send buffer configured as a circular buffer, the receive area including a read index section, a write index section, and a receive buffer configured as a circular buffer, the receive buffer of the processing unit having the same size as a send buffer of the other processing unit, the read index section and the write index section being configured to store a read index and a write index, to which buffer addresses may be assigned;

wherein, on a sender side, the processing unit is configured to repeatedly carry out as sending steps:

reading the read index from the read index section of the receive area of the processing unit;

writing at least one send packet into the send buffer of the processing unit from a starting write address to an ending write address, the ending write address maximally corresponding to the buffer address assigned to the read read index, and the starting write address being situated behind the ending write address of a preceding repetition of the sending steps; and determining the write index in such a way that the ending write address is assigned to the write index, and writing the determined write index to the write index section of the send area of the processing unit, wherein on a receiver side, the processing unit is configured to repeatedly carry out as receiving steps:

reading the write index from the write index section of the receive area of the processing unit;

reading at least one reception packet from the receive buffer of the processing unit from a starting read address to an ending read address, the ending read address, proceeding from the starting read address, maximally corresponding to the buffer address assigned to the read write index, and the starting read address being situated behind the ending read address of a preceding repetition of the receiving steps; and determining the read index in such a way that the ending read address is assigned to the read index, and writing the determined read index into the read index section of the send area of the processing unit.

\* \* \* \* \*